(12) United States Patent
Häberle et al.

(10) Patent No.: US 6,358,574 B1
(45) Date of Patent: *Mar. 19, 2002

(54) LIQUID-CRYSTALLINE SILICONES HAVING INCREASED UV STABILITY

(75) Inventors: Norman Häberle; Jürgen Küpfer, both of München; Horst Leigeber, Oberhaching, all of (DE)

(73) Assignee: Consortium fur Elektrochemische Industrie GmbH, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/455,875

(22) Filed: Dec. 6, 1999

(30) Foreign Application Priority Data

Dec. 14, 1998 (DE) .......................... 198 57 691

(51) Int. Cl.$^7$ .................... C09K 19/38; C09K 19/40; C08G 77/06
(52) U.S. Cl. ................ 428/1.52; 252/299.01; 106/481; 106/494; 556/466; 556/478; 556/479; 528/31; 528/32; 528/33; 528/26
(58) Field of Search ............ 252/299.01; 428/1.1, 428/1.52; 556/446, 478, 479; 528/31, 32, 33, 26; 106/481, 494

(56) References Cited

U.S. PATENT DOCUMENTS

| B14,127,598 | 9/1985 | McEntee |
|---|---|---|
| 4,774,347 A | 9/1988 | Marko et al. |
| 5,211,877 A | 5/1993 | Andrejewski et al. |
| 5,221,759 A | 6/1993 | Haeberle et al. |
| 5,362,315 A | 11/1994 | Müller-Rees et al. |
| 5,442,025 A | 8/1995 | Spes et al. |
| 5,695,680 A | 12/1997 | Weitzel et al. |
| 5,777,145 A | 7/1998 | Marko |
| 6,040,411 A | 3/2000 | Haberle et al. |

FOREIGN PATENT DOCUMENTS

| DE | 43 27 359 A1 | 2/1995 |
|---|---|---|
| DE | 197 26 047 A1 | 12/1998 |
| EP | 0 358 208 A2 | 3/1990 |
| EP | 0 446 912 A1 | 9/1991 |
| EP | 0 601 483 A1 | 6/1994 |
| WO | WO 94/09086 | 4/1994 |

OTHER PUBLICATIONS

Derwent Abstract Corresponding to WO 94/09086 (AN 1994—136715).
International Serach Report—Apr. 20, 2000.
"Macromolecular Chemistry and Physics 195", Martin Brehmer, Rudolf Zentel, Jun. 1994, No. 6.
Derwent Abstract Corresponding To DE–A 43 27 359 (AN 1995—082916).
"Chemie Ingenieur Technik (69)", pp. 283–290.
"Materials and Corrosion", (1997), pp. 542–548.

*Primary Examiner*—Shean C. Wu
(74) *Attorney, Agent, or Firm*—Brooks & Kushman P.C.

(57) ABSTRACT

Crosslinkable LC organosiloxanes exhibiting excellent UV stability, contain units of the general formula 1

$$[R_b Mes_c SiO_{(4-b-c)/2}] \qquad (1)$$

in which
R are $C_1$–$C_4$-alkyl radicals,
Mes is at least one group of the general formula 2 and, if desired, of the general formula 3,
b has the value 0, 1 or 2, and
c has the value 0, 1, 2, 3 or 4, with the proviso that the sum of the values of b and c is a maximum of 4, where the Mes groups of the general formulae 2 and 3 exhibit the following structure:

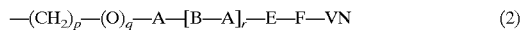

(2)

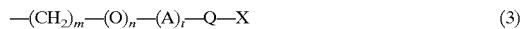

(3)

in which
A, B, Q, X, E, F, VN, m, p, n, q, t and r have the meanings given in claim 1, with the proviso that the LC organosiloxanes do not constitute a phenyl ester derivative of an aliphatic, aromatic or heteroaromatic carboxylic acids.

29 Claims, No Drawings

LIQUID-CRYSTALLINE SILICONES HAVING INCREASED UV STABILITY

TECHNICAL FIELD

The invention relates to crosslinkable liquid-crystalline organosiloxanes (LC organosiloxanes) having increased UV resistance, to a process for their preparation, and to their use.

BACKGROUND ART

The preparation and use of crosslinkable LC organosiloxanes is known in principle, for example from U.S. Pat. No. 5,211,877 and U.S. Pat. No. 5,362,315. In addition to the mesogens which are the primary factors in determining the properties, these compounds also contain, in adjustable proportions, molecule constituents which firstly contribute to the mesogenic properties of the silicones, but secondly are capable, by means of polymerizable groups, of irreversibly fixing by three-dimensional crosslinking, certain physical and chemical properties which are characteristic of the crosslinked LC silicones thus prepared. Depending on the type and amount of further copolymerizable mesogens and/or chiral compounds and other constituents which participate in crosslinking, it is thus possible to prepare, for example, pigments whose color is based on the cholesteric phase of a copolymerized, optically active mesogen.

Although the LC pigments mentioned in U.S. Pat. No. 5,211,877 and U.S. Pat. No. 5,362,315 satisfy most requirements, they have the disadvantage of being inadequately resistant to UV light.

DISCLOSURE OF INVENTION

The object of the invention was therefore to provide crosslinkable building blocks which allow a more favorable construction of molecules suitable for preparation of UV stable LC organosiloxanes.

BEST MODE FOR CARRYING OUT THE INVENTION

The invention relates to crosslinkable LC organosiloxanes containing units of the general formula 1

$$[R_b Mes_c SiO_{(4-b-c)/2}] \quad (1)$$

in which

R are $C_1$–$C_4$-alkyl radicals,

Mes is at least one group of the general formula 2 and, if desired, of the general formula 3, b has the value 0, 1 or 2, and c has the value 0, 1, 2, 3 or 4, with the proviso that the sum of the values of b and c is a maximum of 4, where the Mes groups of the general formulae 2 and 3 exhibit the following structure:

$$—(CH_2)_p—(O)_q—A—[B—A]_r—E—F—VN \quad (2)$$

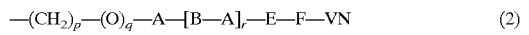

$$—(CH_2)_m—(O)_n—(A)_t—Q—X \quad (3)$$

in which

A is a divalent radical from the group consisting of a 1,4-cyclohexylene ring, a 4,4'-bicyclohexylene radical, a 1,4-phenylene ring, a 2,6-naphthylene radical, a 2,7-naphthylene radical, a 2,5-(1,3-dioxanylene) ring and a pyrimidinyl radical, Q is a radical from the group consisting of —COO—, —OCO—, —O—, a chemical bond, and —O—(C=O)—O—, X is a cholesteryl, dihydrocholesteryl, doristeryl, isosorbidyl, isomannidyl or cholic acid radical or an unsubstituted or substituted radical selected from the group consisting of 1,4-phenylene, 4,4'-biphenylyl, 1,4-cyclohexylene, 4,4'-bicyclohexylene, 4,4'-cyclohexylenephenylene, 2,5-(1,3-dioxanylene) and pyrimidinyl radicals, where the substituent can be a $C_1$- to $C_5$-alkoxy radical, a $C_1$- to $C_5$-alkyl radical, a cyano radical, a chlorine radical or a nitro radical, B is a divalent radical from the group consisting of a chemical bond, —O—$CH_2$—, —$CH_2$—O—, —$CH_2$—$CH_2$—, —CH=CH—, —COO— and —OCO—, E is a divalent radical from the group consisting of a chemical bond, —O—, —COO—, —OCO— and —$CH_2$—O—, F is a chain of from 0 to 11 $CH_2$ groups, in which individual, non-adjacent $CH_2$ groups may be replaced by oxygen, VN is a —COO—CH=$CH_2$, —COO—C($CH_3$)=$CH_2$ or —O—CH=$CH_2$ group, an oxiranyl group or a —$(CH_2)_u$—OCH=$CH_2$ group, u is an integer from 2 to 8, m and p are integers from 3 to 7, n and q are 0 or 1, t is an integer from 1 to 3, and r is an integer from 1 to 3, with the proviso that the combinations of rings A with binding groups B do not constitute phenyl ester derivatives of aliphatic, aromatic or heteroaromatic carboxylic acids.

The invention is based on the discovery that the lack of stability to UV light of the known crosslinkable LC organosiloxanes and crosslinked LC silicones is caused primarily by the use of phenyl carboxylates as mesogen components. Such mesogens are accessible inexpensively and in a technically uncomplicated way by normal esterification reactions. However, on exposure to UV light, phenol esters undergo a rearrangement of these moieties which is known from the literature as the "Fries photorearrangement". Even daylight contains sufficient UV light to facilitate this rearrangement.

In this rearrangement, 4-substituted phenyl esters which are used to build up liquid-crystalline phases, or incorporated fragments of these esters in the mesogen, form a mixture of aromatic ketones and other compounds, which are usually relatively strongly colored and in which the substituents originally in the 4-position to the phenol oxygen are moved into other positions which hinder the formation of LC phases. The keto group formed from the carboxyl binding group likewise hinders the formation of LC phases.

The crosslinkable LC organosiloxanes containing units of the general formula 1 avoid mesogen components containing phenyl esters of carboxylic acids. This makes the LC organosiloxanes containing units of the general formula 1 more UV stable. Lateral phenyl substituents, such as, for example, fluorine radicals, in the ortho-positions to 1- and/or 4-substituents do not cause a lack of stability to UV light. The crosslinkable LC organosiloxanes preferably contain from 1 to 70 units of the general formula 1.

In order to achieve particular properties, the compounds according to the invention can be mixed together with isolated further components, for example crosslinking agents, as individual compounds or as mixtures thereof, and/or with further property-modifying, copolymerizable compounds. Examples include chiral compounds which are capable of hydrosilylation for establishing properties such as desired reflection wavelengths. The compounds according to the invention can also be mixed with non-copolymerizable compounds, and crosslinked in their presence.

The additional copolymerizable crosslinking agent components can be known compounds, preferably carrying a terminal and thus hydrosilylation-capable double or triple bond at one end of elongate molecules, and a crosslinkable group, such as the acryloyl radical or the methacryloyl radical, at the other end. These compounds conform, for example, to the general formula 4

$$CH_2=CH-(CH_2)_{p-2}-(O)_q-A-[B-A]_r-E-F-VN \qquad (4)$$

in which A, B, E, F, VN, p, q and r can adopt the meanings given for the general formulae 2 and 3, where, if necessary, proportions of additional crosslinking agent components which may also contain phenol ester groups can also occur here if the UV stability of the system as a whole is not thereby impaired, but other, desirable properties, such as, for example, a low glass transition temperature and/or a higher crosslinking density of crosslinked LC organosiloxanes prepared therewith can be achieved. An example of a compound of this type is 4-methacryloyloxyphenyl-4-allyloxybenzoate, known from WO 94/09086.

In addition, further mesogenic or non-mesogenic compounds containing at least one and optionally a plurality of polymerizable groups can be admixed with the organosiloxanes according to the invention and reacted together therewith to give a three-dimensionally crosslinked, insoluble LC substance, such as a pigment. Examples of such compounds are crosslinking agent components of the general formula 5

$$CH_2=CH-(CH_2)_{p-2}-(O)_q-A-[B-A]_r-E-F-VN \qquad (5)$$

in which A, B, E, F, VN, p, q and r have the meanings given for the general formula 2; bisacrylates or bismethacrylates of mesogenic compounds of the general formula 6

$$VN-(CH_2)_r-[M-A]_t-M-(CH_2)_r-VN \qquad (6)$$

in which

M is an oxygen atom, a carboxyl group or an oxycarbonyl group, and

VN, A, r and t can adopt the above meanings. These can be employed alone or as a mixture of various compounds of the general formulae 5 and 6 or as a mixture with non-mesogenic bisacrylates and/or bismethacrylates.

In the general formula 5, p preferably has a value of from 3 to 6, a preferably has the value 0, 1 or 2, A is preferably a 1,4-phenylene radical, and VN is preferably a methacryloyl radical.

Examples of non-mesogenic compounds which can be used as additional components are bisacrylates and bismethacrylates of straight-chain or branched aliphatic or cycloaliphatic diols or triols or of polyethers; trismethacrylates or bisvinyl ethers of aliphatic diols. These may be used individually or as mixtures of such compounds.

In addition, the LC organosiloxanes according to the invention can also be mixed with substances which contain no polymerizable groups and function as external plasticizers in the substance formed after the polymerization. Examples of compounds of this type are phthalic diesters, sebacic diesters or other compounds usually used for this purpose.

Before crosslinking, the liquid-crystalline organosiloxanes can also be mixed with further property-modifying, copolymerizable compounds, for example further chiral, hydrosilylation-capable or non-hydrosilylation-capable compounds in order to establish targeted properties, such as desired reflection wavelengths. It is likewise possible to admix coloring compounds.

Owing to their desirable properties, in particular increased elasticity of products produced therewith, easier access to the compounds, and greater brightness of the colorants produced therewith, preference is given to compounds of the general formula 1 in which R is a methyl radical, m and p are integers from 3 to 5, X is a cholesteryl radical, a doristeryl radical, an isosorbidyl radical or an unsubstituted or 4-substituted phenyl radical whose substituents are $C_1$- to $C_3$-alkoxy radicals, $C_1$- to $C_3$-alkyl radicals, a cyano radical or a nitro radical, and B is a chemical bond or an —O—$CH_2$—, —$CH_2$—O— or —$CH_2$—$CH_2$— group.

The UV-stable organosiloxanes according to the invention are preferably open-chain, cyclic or silsequioxanes, more preferably cyclic siloxanes.

The UV-stable, highly crosslinkable, liquid-crystalline organosilicones according to the invention can be prepared by processes known in principle by reacting organosilicon compounds containing units of the general formula 7

$$[R_bH_cSiO_{(4-b-c)/2}] \qquad (7)$$

in which R, b and c have the meanings given in the general formula 1, preferably in the presence of at least one metal from the platinum group and/or compounds thereof, with compounds of the general formulae 5 and, if desired, 8

$$CH_2=CH-(CH_2)_{m-2}-(O)_n-(A)_t-Q-X \qquad (8)$$

in which A, Q, X, m, n and t have the meanings given for the general formula 3.

The novel feature of the compounds of the general formula 5 is that they have at one end of the preferably rod-shaped molecule a terminal double bond which can be hydrosilylated, but at the other end have a polymerizable group which has different reactivity from the olefinic group and which is crosslinkable, but does not hinder the hydrosilylation of the olefinic double bond.

The above reaction is preferably carried out in the presence of least one metal from the platinum group and/or compounds thereof as catalyst. The total number of moles of the compounds of the general formulae 7 and 8 corresponds, depending on the respective reactivity, to 0.75 to 1.25 times the total number of all Si—H bonds in the organosiloxanes of the general formula 7.

The composition of the compounds of the general formulae 7 and 8 is freely selectable, with the proviso that at least one Si—H bond of the silane of the general formula 5 is reacted with a compound of the general formula 8.

Examples of auxiliaries are known inorganic or organic pigments, adhesion promoters, further polymers, emulsifiers, stabilizers and other, usually conventional additives.

Examples of metals from the platinum group and/or compounds thereof, referred to below as the hydrosilylation catalyst, which can effect the process according to the invention are platinum, palladium, rhodium, iridium and compounds thereof, preferably platinum and/or compounds thereof. All catalysts which have also been employed hitherto for the addition of hydrogen atoms bonded directly to silicon atoms onto aliphatically unsaturated compounds can be employed here. Examples of such catalysts are metallic and finely divided platinum, which can also be on supports, such as silicon dioxide, aluminum oxide or activated carbon, compounds or complexes of platinum, such as platinum halides, for example $PtCl_4$, $H_2PtCl_6.6H_2O$, $Na_2PtCl_4.4H_2O$, platinum-olefin complexes, platinum-alcohol complexes, platinum-alkoxide complexes, platinum-ether complexes, platinum-aldehyde complexes, platinum-ketone complexes, including products of the reaction of $H_2PtCl_6.6H_2O$ and cyclohexanone, platinum-vinylsiloxane complexes, in particular platinum-divinyltetramethyldisiloxane complexes with or without a content of detectable inorganically bound halogen, bis(gamma-picolinyl)platinum dichloride, trimethylenedipyridinylplatinum dichloride, dicyclopentadienylplatinum dichloride, (dimethyl sulfoxide)ethyleneplatinum (II) dichloride, and products of the reaction of platinum tetrachloride with an olefin and a primary amine, secondary amine, or both primary and secondary amines, such as the product of the reaction of platinum tetrachloride dissolved in 1-octene with sec-butylamine, or ammonium-platinum complexes.

The hydrosilylation catalyst is employed in effective amounts, preferably in amounts of from 0.05 to 0.50 mmol, in each case calculated as elemental platinum and based on the number of moles of the reaction components, i.e., the compound(s) of the general formula 2 or 3 or the siloxane derivatives containing at least one hydrogen atom bonded directly to silicon, which is/are present in a substoichiometric or stoichiometric amount.

The reaction is preferably carried out at temperatures of from 0° C. to 150° C., preferably at pressures of from 0.05 MPa to 2.0 MPa. If the siloxane of the general formula 7 or the compound(s) of the formulae 5 and/or 8 are very slow to react, the process can also be carried out at elevated temperatures, higher pressures and in the presence of more platinum catalyst.

The reaction is preferably carried out in a solvent, which is preferably aprotic. Solvents or solvent mixtures having a boiling point or boiling range of up to 160° C., preferably up to 120° C., in each case at 0.1 MPa (abs.), are preferred. Examples of solvents are esters such as methyl acetate, ethyl acetate, n-propyl and isopropyl acetate, n-, sec- and t-butyl acetate, ethyl formate and diethyl carbonate; ethers such as dioxane, tetrahydrofuran, diethyl ether, di-n-propyl ether, diisopropyl ether, di-n-butyl ether, ethylene glycol monomethyl ether, ethylene glycol monoethyl ether, diethylene glycol dimethyl ether. and anisole; chlorinated hydrocarbons such as dichloromethane, trichloromethane, tetrachloromethane, 1,2-dichloroethane, trichloroethylene, tetrachloroethylene, and chlorobenzene; hydrocarbons such as pentane, n-hexane, hexane isomer mixtures, cyclohexane, heptane, octane, petroleum benzine, petroleum ether, benzene, toluene and xylenes; ketones such as acetone, methyl ethyl ketone and methyl isobutyl ketone; and mixtures of these solvents.

The term solvent does not necessarily mean that all the reaction components must dissolve therein. The reaction can also be carried out in a suspension or emulsion of one or more reactants. The reaction can also be carried out in a solvent mixture having a miscibility gap, where in each case at least one reactant is soluble in each of the mixture phases.

The LC organosiloxanes can be three-dimensionally crosslinked by means of free radicals or by photocrosslinking, if desired as in admixture with additives. The crosslinked LC organosiloxanes can be employed as pigments or for the production of optical elements, such as structured filters, polarizers and retardation plates.

The preparation of the compounds of the general formula 5 is known, for example from U.S. Pat. No. 5,221,759.

In the examples below, unless otherwise stated, all amounts are based on weight; all pressures are 0.10 MPa (abs.); and all temperatures are 20° C. The following abbreviations are used: C=crystalline; N=nematic; S=smectic; m.p.=melting point; and BHP=2,6-di-tert-butyl-4-methylphenol.

EXAMPLES

Example 1

4-Methacryloyloxycyclohexyl 4-allyloxybenzoate, Substance Example 1

58 g (0.5 mol) of trans-1,4-cyclohexanediol (prepared by fractional crystallization of the bisacetate of the commercial cis/trans mixture and hydrolysis of the separated-off trans-bisacetate by the method of H. Batzer and G. Fritz, Makromol. Chemie 14 (1954), p. 179 ff.) were dissolved in 300 ml of ethylene glycol dimethyl ether at 85° C., 25 g (0.25 mol) of triethylamine were added, and 49 g (0.25 mol) of allyloxybenzoyl chloride were added dropwise at 85° C. After the mixture had been stirred at 85° C. for 5 hours, it was cooled and evaporated, and the residue shaken with toluene/water. The organic phase was dried and evaporated, and the residue was dissolved in methyl tert-butyl ether at 60° C. The product was purified by addition of heptane until crystallization commenced and by cooling. 30 g of trans-4-hydroxycyclohexyl-4-allyloxybenzoate (27%) were obtained.

27.6 g (0.1 mol) of trans-4-hydroxycyclohexyl-4-allyloxybenzoate, 0.1 g of 2,6-di-tert-butyl-4-methylphenol and 20.9 g (0.13 mol) of methacrylic anhydride were dissolved in 10 ml of toluene, 0.2 g of 4-toluenesulfonic acid were added, and the mixture was warmed to 110° C. with stirring. After the mixture had been stirred at 110° C. for 75 minutes, the toluene and excess methacrylic anhydride were removed by distillation, the residue was dissolved in 200 ml of methyl tert-butyl ether, and excess methacrylic acid was removed by washing with 0.5 N sodium hydroxide solution. The mixture was washed with water, dried using sodium sulfate and evaporated to dryness. The residue was taken up in 80 ml of diethyl ether, and the solution was then cooled, during which the target product crystallized out. The residue from the evaporated mother liquor was taken up in heptane at 60° C., an insoluble component was separated off, and a second fraction of the desired ester obtained by crystallization. Recrystallization of the two components from heptane gave the target product in a yield of 64%. $C_{20}H_{24}O_5$=344.4, m.p. 82–84° C., clearing point 86° C.

Example 2

4-Methacryloyloxymethyl-trans-cyclohexyl-1-methyl 4-allyloxyphenylacetate, Substance Example 2

166.2 g (1 mol) of commercial methyl 4-hydroxyphenylacetate (Acros, D-41470 Neuss), 181.5 g (1.5 mol) of allyl bromide and 415 g of potassium carbonate were suspended in 400 ml of methyl ethyl ketone, and the mixture was heated to reflux with stirring and held under reflux for 6 hours. The mixture was cooled and filtered, the filtrate was evaporated, and the residue was fractionated, giving 173 g (83.8%) of the desired ester in a boiling range of 90–97° C. and at a pressure of 0.05 hPa. This ester was hydrolyzed in a conventional manner using methanol/KOH to give the free acid. The acid was recrystallized from benzine having a b.p. of 100–140° C. and exhibited a m.p. of 82° C.

trans-1,4-Cyclohexanedimethanol (Acros, D-41470 Neuss) was monoesterified azeotropically using methacrylic acid in a molar ratio of 1:1 in n-pentane as solvent and with 4-toluenesulfonic acid as catalyst. 8.8 g (0.04 mol) of this liquid monomethacrylate were reacted with 8.5 g (0.04 mol) of 4-allyloxyphenylacetyl chloride (prepared from the above-described acid by conventional reaction with thionyl chloride; b.p. 92–94° C. at 0.013 hPa) and 4.5 g of triethylamine (0.045 mol) in toluene at 60° C., the mixture was cooled, the amine hydrochloride precipitate was filtered off, and the product was washed with 0.2 N NaOH, then with water, then with 0.2 N hydrochloric acid and then again with water, dried azeotropically and evaporated. The target product is liquid.

Example 3

4-Methacryloyloxybutyl 4-(4-trans-3-butenyl-cyclohexylmethyl)oxybenzoate, Substance Example 3

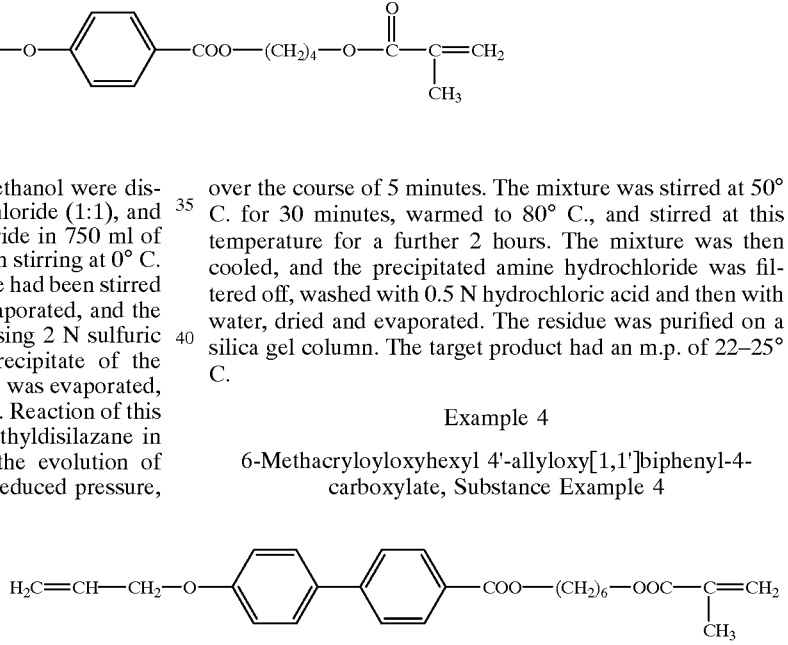

45 g (0.31 mol) of 1,4-cyclohexanedimethanol were dissolved in 750 ml of pyridine/methylene chloride (1:1), and 60 g (0.32 mol) of 4-toluenesulfonyl chloride in 750 ml of the same mixture were added dropwise with stirring at 0° C. over the course of 9 hours. After the mixture had been stirred at 20° C. for a further 12 hours, it was evaporated, and the residue was diluted with ether, acidified using 2 N sulfuric acid and washed with water. After a precipitate of the bistosylate had been filtered off, the residue was evaporated, giving 58 g (62%) of the oily monotosylate. Reaction of this quantity with 30.7 g (0.2 mol) of hexamethyldisilazane in toluene at 110° C. until completion of the evolution of ammonia followed by evaporation under reduced pressure, gave the toluenesulfonate of 1-trimethylsilyloxymethylcyclohexane-4-methanol (yellowish oil, virtually quantitative).

A Grignard solution was prepared from 27 ml (0.3 mol) of allyl bromide and 8.5 g (0.35 mol) of magnesium in a total of 230 ml of ether at 0° C. to 10° C., and the solution was introduced dropwise (1 hour) at 20° C. with stirring into ether concurrently with a solution of the above silyl ether (dissolved in 100 ml of ether) in the presence of 0.2 g of LiCuBr$_4$ as catalyst. A precipitate formed. After a post-reaction time of 1 hour at 35° C. and stirring for 12 hours, the mixture was poured into ice-water, acidified using hydrochloric acid and stirred thoroughly, during which the trimethylsilyl radical was cleaved off. After phase separation, drying and evaporation, the residue was fractionated at 12 hPa and 128–130° C., giving 21 g (52%) of 4-(but-3-enyl)-1-hydroxymethylcyclohexane.

Conventional reaction of this alcohol with 4-toluenesulfonyl chloride/pyridine gave the tosyl ester of the alcohol (yellow liquid; 91% yield).

65 g (0.2 mol) of the above tosyl ester were added to a solution of 36.5 g (0.24 mol) of potassium tert-butoxide dissolved in tert-butanol, and the mixture was warmed to reflux with stirring and stirred under reflux for 8.5 hours. After cooling, the mixture was hydrolyzed and extracted with methyl tert-butyl ether, and the organic phase was washed (twice with water), dried and evaporated. The residue was again partitioned between 2 N NaOH and methyl tert-butyl ether, and the purification procedure was repeated, giving 37 g (60%) of methyl 4-(but-3-enylcyclohexylmethoxy)benzoate. This ester was hydrolyzed in a conventional manner using KOH/methanol to give the free acid, which was reacted with thionyl chloride to give 4-(but-3-enylcyclohexylmethoxy)benzoyl chloride. 18 g (0.06 mol) of this acid chloride and 10.0 g (0.063 mol) of commercial 1,4-butanediol monomethacrylate (Polysciences, D-69208 Eppelheim) were dissolved in 15 ml of toluene, and a solution of 6.1 g (0.067 mol) of triethylamine dissolved in 40 ml of toluene was added dropwise over the course of 5 minutes. The mixture was stirred at 50° C. for 30 minutes, warmed to 80° C., and stirred at this temperature for a further 2 hours. The mixture was then cooled, and the precipitated amine hydrochloride was filtered off, washed with 0.5 N hydrochloric acid and then with water, dried and evaporated. The residue was purified on a silica gel column. The target product had an m.p. of 22–25° C.

Example 4

6-Methacryloyloxyhexyl 4'-allyloxy[1,1']biphenyl-4-carboxylate, Substance Example 4

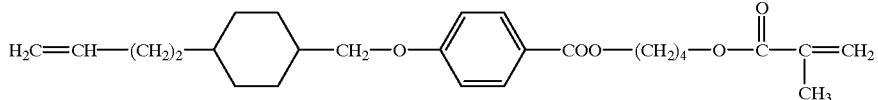

The methyl ester of commercial 4'-hydroxy[1,1']biphenyl-4-carboxylic acid (Aldrich, D-89555 Steinheim) was prepared using methanol and sulfuric acid as catalyst, and methyl 4'-allyloxy[1,1']biphenyl-4-carboxylate (m.p. 149° C.) was prepared therefrom using potassium carbonate/allyl bromide in methyl ethyl ketone as solvent. Conventional hydrolysis of this ester using KOH/methanol gave the free carboxylic acid, which was converted into the acid chloride by the likewise conventional reaction of the acid with thionyl chloride. 9.4 g (34.5 mmol) of this acid chloride and 0.1 g of BHT were dissolved in toluene, and a solution of 5.5 g (34.5 mmol) of 1,4-butanediol monomethacrylate and 4.0 g (39.7 mmol) of triethylamine, dissolved in toluene, was added dropwise at room temperature with stirring. The mixture was then heated at 45° C. for 90 minutes and cooled, the triethylamine hydrochloride was filtered off, and the filtrate was worked up. The crude product was recrystallized from isopropanol, and then had the following phase behavior: crystalline below 68° C., smectic at 68° C., isotropic already below 120° C., decomposes at 120° C.

Example 5

4-(6-Methacryloylhexyl)cyclohexyl 4-allyloxybenzoate, Substance Example 5

55.2 g (0.2 mol) of trans-4-hydroxycyclohexyl allyloxybenzoate prepared as described in Example 1 were dissolved in 300 ml of dry toluene, and 43 g (0.205 mol) of 6-bromohexanoyl chloride (prepared from the free acid by conventional reaction with thionyl chloride; b.p. 60–62° C. at 0.04 mbar) were added dropwise at 105° C. over the course of 60 minutes with stirring. After the mixture had been stirred at 105° C. for a further 90 minutes, the solvent was stripped off under reduced pressure, and the residue was crystallized out using petroleum benzine/methyl tert-butyl ether (20:1), giving 83 g (92%) of trans-[4-(6-bromohexanoyl)cyclohexyl] 4-allyloxybenzoate, melting point 56° C. 79 g (0.174 mol) of this ester, 25 g (0.21 mol) of potassium methacrylate and 0.2 g of 2,6-di-tert-butyl-4-methylphenol (stabilizer) were dissolved in 400 ml of dimethylformamide, and the mixture was heated at 70–75° C. for 3 hours with stirring. The solvent was then distilled off under reduced pressure, the residue was taken up in 400 ml of methyl tert-butyl ether, and the solution was washed with water, 0.05 N NaOH, and again with water, dried and evaporated. The residue was recrystallized from methanol, yielding 70 g (87.5%) of the title compound, which melts at 50° C. and clears at 55° C.

Example 6

(comparative example)
Known liquid-crystalline silicone, Substance Example 6

170 ml of toluene were added to 71 g (0.13 mol) of cholesteryl 4-allyloxybenzoate. The suspension was brought to the boil with stirring, and toluene was brought to incipient azeotropic distillation. After the mixture had been cooled to about 60° C., 21 g (0.351 mol) of 1,3,5,7-tetramethylcyclotetrasiloxane and 0.5 g of a 0.5% strength by weight solution of cyclooctadienyldichloroplatinum catalyst in methylene chloride was added. The reaction solution was warmed to 85° C. and stirred for 1 hour. After the mixture had been cooled to about 40° C., 65.5 g (0.194 mol) of 4-methacryloyloxyphenyl 4-allyloxybenzoate, 0.08 g (0.035 mol) of BHT and 1.06 g of a 0.5% strength by weight solution of the cyclooctadienyldichloroplatinum catalyst in methylene chloride were added. The solution was subsequently warmed to about 75° C. and stirred for 1.5 hours. After the mixture had been cooled to room temperature, 39.4 g (0.116 mol) of 4-methacryloyloxyphenyl 4-allyloxybenzoate and 0.078 g (0.035 mol) of BHT were added. The solution was subsequently filtered through a short Celite column, and 4.92 g of the photoinitiator Irgacure 907 were added.

The solution was freed from solvent by means of a thin-film evaporator at a pressure of 25 mbar and a heating-jacket temperature of 90° C. (residual content<1% by weight of toluene). The resultant liquid crystal has a glass transition at about 15° C. The clearing point (peak) from cholesteric to isotropic is at 146° C. The viscosity is about 1500 mPas at 90° C.

UV-crosslinked thin films of the material which have been aligned at 90° C. have, after cooling to room temperature, a reflection wavelength of 710 nm. The crosslinked material has a glass transition temperature of 83° C. The fraction which can be extracted from the crosslinked material by treatment with chloroform is 14% by weight.

Example 7

Liquid-crystalline, UV-stable silicone; pigment base mixture, Substance Example 7

In entirely the same manner as described in Example 6, an oligomer was prepared from cholesteryl 4-allyloxybenzoate, 1,3,5,7-tetramethylcyclotetrasiloxane and 4-(6-methacryloylhexyl)cyclohexyl 4-allyloxybenzoate= (Substance Example 5) and, likewise in the same manner as described in Example 6, mixed with an equimolar amount of 4-(6-methacryloylhexyl)cyclohexyl 4-allyloxybenzoate, and the solution freed from solvent by means of a thin-film evaporator at a pressure of 25 mbar and a heating-jacket temperature of 90° C. (residual content<1% by weight of toluene).

The resultant liquid crystal has a glass transition at about −11° C. The clearing point (peak) from cholesteric to isotropic is at 67° C. The viscosity is about 1190 mPas at 90° C.

UV-crosslinked thin films of the material which have been aligned at 40° C. have, after cooling to room temperature, a reflection wavelength of 555 nm. The crosslinked material has a glass transition temperature of 62° C. The fraction which can be extracted from the crosslinked material by treatment with chloroform is 11% by weight.

Example 8

UV stability of compounds according to the invention compared with known crosslinking agent derivatives The UV stability of monomeric compounds was determined by the following method:

10 mg of substance were weighed out, 10 ml of solvent were added (in general, dichloroethane; Aldrich, D-89555 Steinheim, spectrophotometric grade) and set to a dilution having an optical density of about 1 for the main absorption band in the UV region. The sample was irradiated with an XBO150 150 W xenon lamp, LOT lamp with quartz condenser and $H_2O$ filter (irradiation strength of the quartz cell, 250 mW/cm$^2$). The measure used for the UV stability was the change in the UV spectra as a function of time.

Compounds having a phenyl carboxylate component exhibited a clear change caused by a Fries photorearrangement. The new bands appearing as a result approached the visible part of the spectrum, it being possible for outliers to extend into the blue. This resulted in a yellow cast of such solutions of these monomers.

Comparison of the UV stabilities of Example Substances 1 to 5 was made with that of 4'-(methacryloyloxy)phenyl 4-allyloxybenzoate, disclosed in U.S. Pat. No. 5,211,877; referred to as comparative substance. For direct comparison, the values for the optical density ("OD") at 350 nm and 400 nm after an irradiation time of 10 minutes are given, in each case based on an optical density of 1 of the non-irradiated substance. The results are presented in Table 1 below.

TABLE 1

|  | Non-irradiated | After 10 Min 250 mW/cm² xenon | | |
| --- | --- | --- | --- | --- |
| Substance | γ max [nm] | γ max [nm] | OD 350 nm | OD 400 Nm |
| Example 1 | 256 | 256 | 0.00 | 0.00 |
| Example 2 | 256 | 256 | 0.00 | 0.00 |
| Example 3 | 258 | 258 | 0.00 | 0.00 |
| Example 4 | 293 | 293 | 0.00 | 0.00 |
| Example 5 | 256 | 256 | 0.00 | 0.00 |
| Example 6 (comparison substance) | 262 | 353 | 0.1 | 0.02 |

Example 9

(Comparison substance)

UV stability of liquid-crystalline LC silicones according to the invention compared with known liquid-crystalline compounds The UV stability was determined by the following method:

A crosslinked film, about 20 μm thick, of the liquid-crystalline, UV-stable silicone referred to as Substance Example 7 was subjected to extended sun exposure in the CPS+sun test of Heraeus Industrietechnik (D-63450 Hanau). The conditions were as follows: irradiation strength 750 W/m² in the spectral region from 300 to 800 nm, film temperature 40° C., irradiation duration 1000 hours. Substance Example 6 (comparative example) was irradiated analogously. The optical density values at 350 nm and 400 run before irradiation and after an irradiation time of 1100 hours were determined:

|  | Before irradiation | | After irradiation for 1100 hours | |
| --- | --- | --- | --- | --- |
| Substance | OD 350 nm | OD 400 nm | OD 350 nm | OD 400 nm |
| Example 7 | 0.03 | 0.02 | 0.06 | 0.02 |
| Comparative Example 6 | 0.237 | 0.06 | 0.40 | 0.19 |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. The terms "a" and "an" means "one or more than one" unless specified otherwise.

What is claimed is:

1. A crosslinkable LC organosilicon compound containing units of the general formula 1

$$[R_b Mes_c SiO_{(4-b-c)/2}] \quad (1)$$

in which

R are $C_1$–$C_4$-alkyl radicals,

Mes is at least one group of the general formula 2, and optionally, further Mes group(s) of the general formula 3, b has the value 0, 1 or 2, and c has the value 0, 1, 2, 3 or 4, with the proviso that the sum of the values of b and c is a maximum of 4, where the Mes groups of the general formulae 2 and 3 exhibit the following structures:

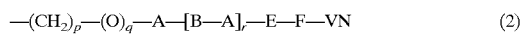

in which

A is a divalent radical from the group consisting of a 1,4-cyclohexylene ring, a 4,4'-bicyclohexylene radical, a 1,4-phenylene ring, a 2,6-naphthylene radical, a 2,7-naphthylene radical, a 2,5-(1,3-dioxanylene) ring and a pyrimidinyl radical, Q is a radical from the group consisting of —COO—, —OCO—, —O—, a chemical bond and —O—(C=O)—O—, X is a cholesteryl, dihydrocholesteryl, doristeryl, isosorbidyl, isomannidyl or cholic acid radical or an unsubstituted or substituted radical selected from the group consisting of 1,4-phenylene, 4,4'-biphenylyl, 1,4-cyclohexylene, 4,4'-bicyclohexylene, 4,4'-cyclohexylenephenylene, 2,5-(1,3-dioxanylene) and pyrimidinyl radicals, where the substituent can be a $C_1$- to $C_5$-alkoxy radical, a $C_1$- to $C_5$-alkyl radical, a cyano radical, a chlorine radical or a nitro radical, B is a radical from the group consisting of a chemical bond, —O—$CH_2$—, —$CH_2$O—, —$CH_2$—$CH_2$—, —CH=CH—, —COO— and —OCO—, E is a divalent radical from the group consisting of a chemical bond, —O—, —COO—, —OCO— and —$CH_2$—O—, F is a chain of from 0 to 11 $CH_2$ groups, in which individual, non-adjacent $CH_2$ groups may be replaced by oxygen, VN is a —COO—CH=$CH_2$, —COO—C($CH_3$)=$CH_2$ or —O—CH=$CH_2$ group, an oxiranyl group or a —$(CH_2)_u$—OCH=$CH_2$ group, u is an integer from 2 to 8, m and p are integers from 3 to 7, n and q are 0 or 1, t is an integer from 1 to 3, and r is an integer from 1 to 3, with the proviso that the combinations of radicals A with radicals B do not constitute phenyl ester derivatives of aliphatic, aromatic or heteroaromatic carboxylic acids.

2. The crosslinkable LC organosilicon compound of claim 1 which comprises an organosiloxane containing from 1 to 70 units of the general formula 1 where (b+c)<4.

3. The crosslinkable LC organosilicon compound of claim 1, wherein F is a chain of from 1 to 11 $CH_2$ groups.

4. The crosslinkable LC organosilicon compound of claim 1, wherein F is a chain of from 4 to 6 $CH_2$ groups.

5. The crosslinkable organosilicon compound of claim 1, wherein VN is —OOC—CH=$CH_2$, —OOC—C($CH_3$)=$CH_2$, or —OOCH=$CH_2$.

6. The crosslinkable organosilicon compound of claim 3, wherein VN is —OOC—CH=$CH_2$, —OOC—C($CH_3$)=$CH_2$, or —OOCH=$CH_2$.

7. A process for the preparation of the crosslinkable LC organosilicon compounds of claim 1, which comprises reacting organosilicon compounds containing units of the general formula 7

$$[R_b H_c SiO_{(4-b-c)/2}] \quad (7)$$

in which R, b and c have the meanings given in general formula (1), with compounds of the general formula 5

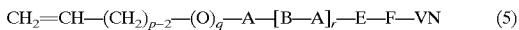

and, optionally, 8

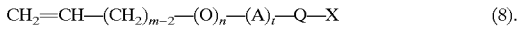

8. A process for the preparation of crosslinkable LC organosilicon compounds as claimed in claim 2, which comprises reacting organosilicon compounds containing units of the general formula 7

in which R, b and c have the meanings given in general formula (1), with compounds of the general formulae 5

and, optionally, 8

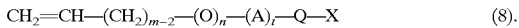

9. A process for the preparation of crosslinkable LC organosilicon compounds as claimed in claim 3, which comprises reacting organosilicon compounds containing units of the general formula 7

in which R, b and c have the meanings given in general formula (1), with compounds of the general formulae 5

and, optionally, 8

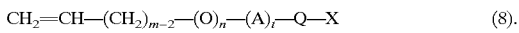

10. A process for the preparation of crosslinkable LC organosilicon compounds as claimed in claim 4, which comprises reacting organosilicon compounds containing units of the general formula 7

in which R, b and c have the meanings given in general formula (1), with compounds of the general formulae 5

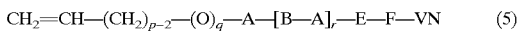

and, optionally, 8

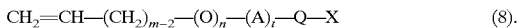

11. A process for the preparation of crosslinkable LC organosilicon compounds as claimed in claim 5, which comprises reacting organosilicon compounds containing units of the general formula 7

in which R, b and c have the meanings given in general formula (1), with compounds of the general formulae 5

and, optionally, 8

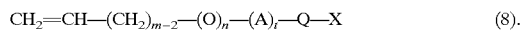

12. A process for the preparation of crosslinkable LC organosilicon compounds as claimed in claim 6, which comprises reacting organosilicon compounds containing units of the general formula 7

in which R, b and c have the meanings given in general formula (1), with compounds of the general formulae 5

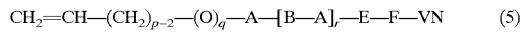

and, optionally, 8

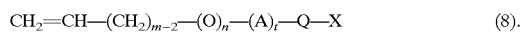

13. A process for crosslinking the LC organosilicon compounds of claim 1, in which the LC organosilicon compounds are three-dimensionally crosslinked by means of free radicals.

14. The process of claim 13, wherein the LC organosilicon compounds are crosslinked with crosslinking agents of the general formula 6

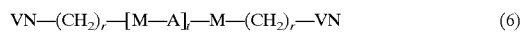

in which

M is an oxygen atom, a carboxyl group or an oxycarbonyl group.

15. The process of claim 13, wherein F is a chain of 1 to 11 $CH_2$ groups.

16. The process of claim 13, wherein F is a chain of 4 to 6 $CH_2$ groups.

17. The process of claim 13, wherein VN is —OOC—CH=$CH_2$, —OOC—C($CH_3$)=$CH_2$, or —O—CH=$CH_2$.

18. The process of claim 14, wherein F is a chain of 1 to 11 $CH_2$ groups.

19. The process of claim 14, wherein F is a chain of 4 to 6 $CH_2$ groups.

20. The process of claim 14, wherein VN is —OOC—CH=$CH_2$, —OOC—C($CH_3$)=$CH_2$, or —O—CH=$CH_2$.

21. A crosslinked LC organosiloxane obtained by the process of claim 13.

22. A crosslinked LC organosiloxane obtained by the process of claim 14.

23. A crosslinked LC organosiloxane obtained by the process of claim 15.

24. A crosslinked LC organosiloxane obtained by the process of claim 17.

25. A pigment, comprising the crosslinked LC organosiloxane of claim 21.

26. A pigment, comprising the crosslinked LC organosiloxane of claim 22.

27. A pigment, comprising the crosslinked LC organosiloxane of claim 23.

28. A pigment, comprising the crosslinked LC organosiloxane of claim 24.

29. An optical element, comprising a crosslinked LC organosiloxane of claim 21.

* * * * *